(12) United States Patent
Nishimura (10) Patent No.: US 6,495,941 B1
(45) Date of Patent: Dec. 17, 2002

(54) DYNAMO-ELECTRIC MACHINE (75) Inventor: Shinji Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 2 days.

(21) Appl. No.: 09/711,094

(22) Filed: Nov. 14, 2000

(30) Foreign Application Priority Data

May 18, 2000 (JP) ........................................ 2000-146757

(51) Int. Cl.$^7$ ................................................. H02K 3/00
(52) U.S. Cl. ...................... 310/184; 310/168; 310/216; 310/254; 310/261
(58) Field of Search ................................ 310/254, 261, 310/268, 216, 114, 184, 67 R, 181, 186, 198; 318/138, 439; 29/596–598

(56) References Cited

U.S. PATENT DOCUMENTS

| | | | | |
|---|---|---|---|---|
| 3,555,330 A | * | 1/1971 | Svecharnik | 310/68 |
| 3,629,626 A | * | 12/1971 | Abbott | 310/49 R |
| 4,027,229 A | * | 5/1977 | Frink | 310/190 |
| 4,048,531 A | * | 9/1977 | Buess et al. | 310/49 R |
| 5,053,666 A | * | 10/1991 | Kliman et al. | 310/261 |
| 5,294,857 A | * | 3/1994 | Auinger et al. | 310/269 |
| 5,448,117 A | * | 9/1995 | Elliott | 310/49 R |
| 5,459,385 A | * | 10/1995 | Lipo et al. | 318/701 |
| 5,537,019 A | * | 7/1996 | Sistine et al. | 318/701 |
| 5,717,269 A | * | 2/1998 | Tang | 310/168 |
| 5,793,139 A | * | 8/1998 | Nashiki | 310/216 |
| 5,834,866 A | * | 11/1998 | Fujitani et al. | 310/49 R |
| 6,111,334 A | * | 8/2000 | Horski et al. | 310/254 |
| 6,278,212 B1 | * | 8/2001 | Kalsi | 310/162 |
| 6,323,573 B1 | * | 11/2001 | Pinkerton | 310/178 |

FOREIGN PATENT DOCUMENTS

| JP | 60-75763 | 4/1985 |
|---|---|---|
| JP | 1-66431 | 3/1989 |

* cited by examiner

Primary Examiner—Tran Nguyen
(74) Attorney, Agent, or Firm—Sughrue Mion, PLLC

(57) ABSTRACT

A dynamo-electric machine includes: a stator having an iron core constructed by linking outer peripheral portions of a plurality of teeth arranged at equiangular pitches in a circumferential direction by an annular core back, and a plurality of coils wound around the teeth; and a rotor constructed by a plurality of magnetic poles composed of magnetic members arranged at equiangular pitches in the circumferential direction, the magnetic poles being formed into one piece by a base portion composed of a nonmagnetic member, and the rotor being rotatably disposed around an axis of the stator and adjacently to an inner periphery of the stator. The plurality of coils are composed of a plurality of first coils that are excited by alternating current and a plurality of second coils that are excited by direct current, each of the coils being wound around each of the teeth without involving any other teeth.

10 Claims, 8 Drawing Sheets

DYNAMO-ELECTRIC MACHINE

BACKGROUND OF THE INVENTION

1. Field of the Invention

The present invention relates to a dynamo-electric machine applicable to a motor and a generator and, more particularly, to a dynamo-electric machine that is directly coupled to a crankshaft of an internal combustion engine to be ideally used for starting the internal combustion engine and for generating power.

2. Description of the Related Art

As a dynamo-electric machine used for such a type of application, there is a claw pole synchronous motor disclosed in, for example, Japanese Patent No. 2641166.

Figure 12:
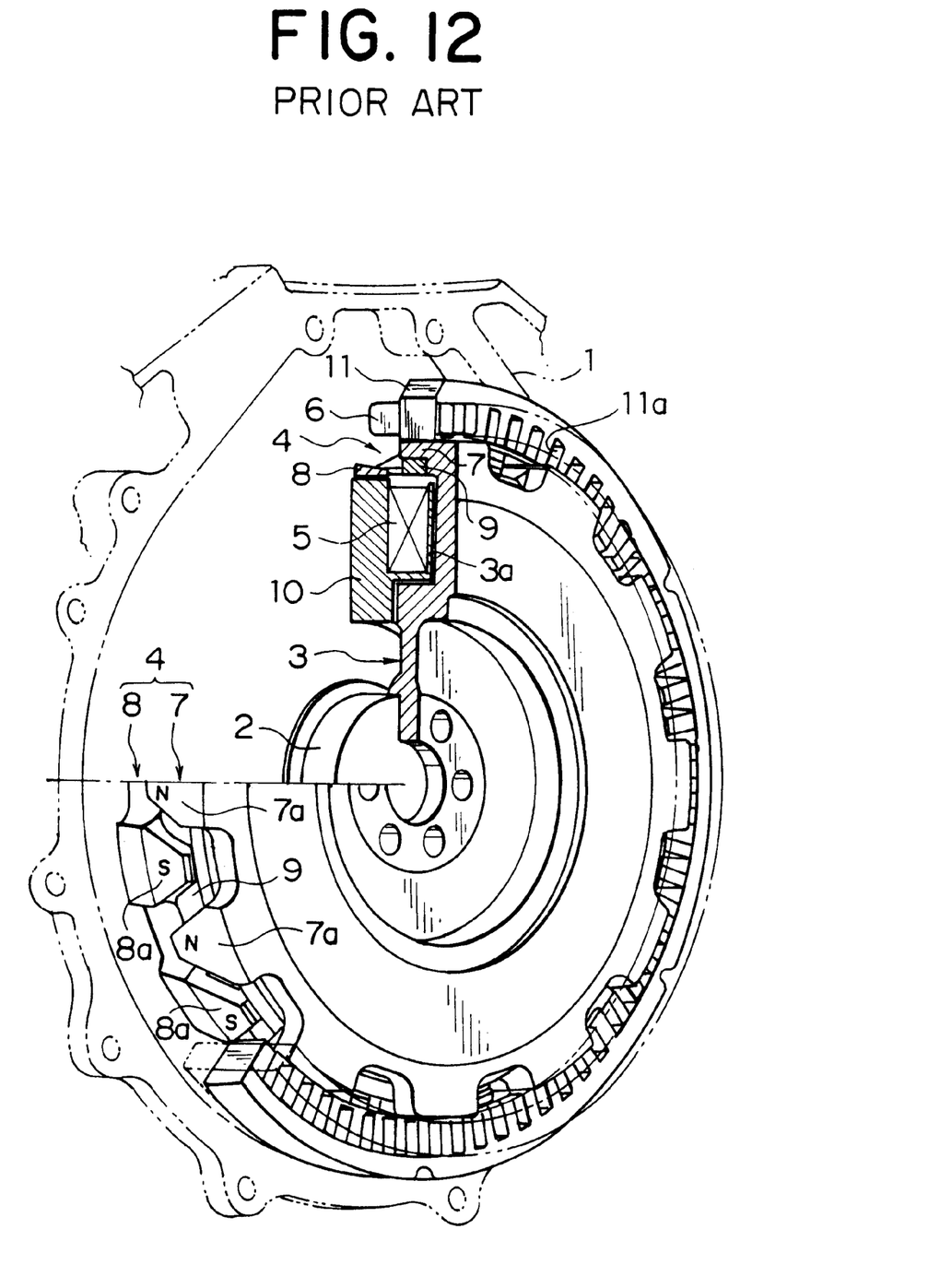
FIG. 12 is a schematic configuration diagram showing a conventional claw pole synchronous motor.

FIG. 12 is a schematic configuration diagram showing the claw pole synchronous motor described in, for example, Japanese Patent No. 2641166.

Referring to FIG. 12, the conventional claw pole synchronous motor is configured using a flywheel 3 attached to a crankshaft 2 projecting from an end surface of an engine main body 1, and equipped with rotating field poles 4 provided on an outer peripheral portion of the flywheel 3, a field coil 5 disposed on an inner peripheral side thereof, and a starter coil 6 disposed on an outer peripheral side thereof. The rotating field poles 4 are provided integrally at regular intervals on the outer peripheral portion of the flywheel 3, and formed of first pole cores 7 having many claws 7a, second pole cores 8 having many claws 8a positioned between the claws 7a, and a nonmagnetic ring 9 coupling the first and second pole cores inside the distal ends of the claws 7a and 8a. The field coil 5 is constructed by winding a conductor around a field core 10 secured to the end surface of the engine main body 1 via a member (not shown) that shuts off a magnetic field, and housed in a recessed section 3a provided in the outer peripheral portion of the flywheel 3 such that its outer peripheral surface is close to and opposes the inner peripheral surface of the rotating magnetic pole 4. Very small gaps are provided between the opposing surfaces of the field core 10 and the flywheel 3 and between the opposing surfaces of the field coil 10 and the rotating field pole 4. The starter coil 6 is constructed by winding a conductor around an annular starter core 11 composed of many stacked steel plates, the inner surface thereof being close to and opposing the outer peripheral surface of the rotating field pole 4. Numerous slots 11a are formed at regular intervals in the inner periphery of the starter core 11. A three-phase coil is constructed by installing conductors in these slots 11a by three-phase distributed winding.

In the claw pole synchronous motor configured as described above, passing Direct currents through the field coil 5 generates a magnetic flux. The magnetic flux causes the claws 7a of the pole core 7 to be magnetized to the north polarity, and the claws 8a of the pole core 8 to be magnetized to the south polarity. Supplying a three-phase alternating current to the starter coil 6 causes a rotating magnetic field to be applied to the rotating field pole 4 to rotationally drive the flywheel 3, that is, the crankshaft 2, thereby starting the engine.

Stopping the supply of the three-phase alternating current to the starter coil 6 causes the rotating magnetic field formed by the rotating field pole 4 to be applied to the starter coil 6 instead. This generates induced electromotive force in the starter coil 6, so that the motor acts as a generator.

As another dynamo-electric machine used for such a type of applications, there is an inductor type generator disclosed in, for example, Japanese Examined Patent Publication No. 2-43029.

Figure 13:
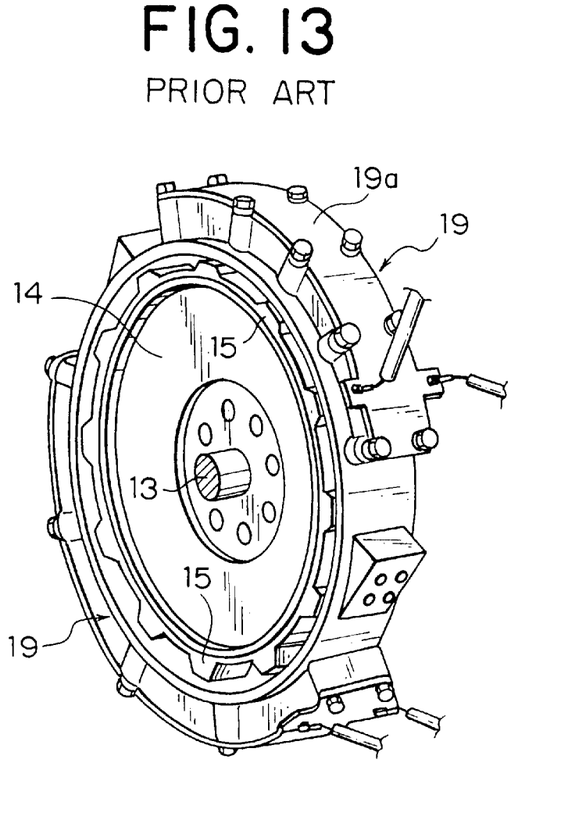
FIG. 13 is a perspective view showing a conventional inductor generator.
Figure 14:
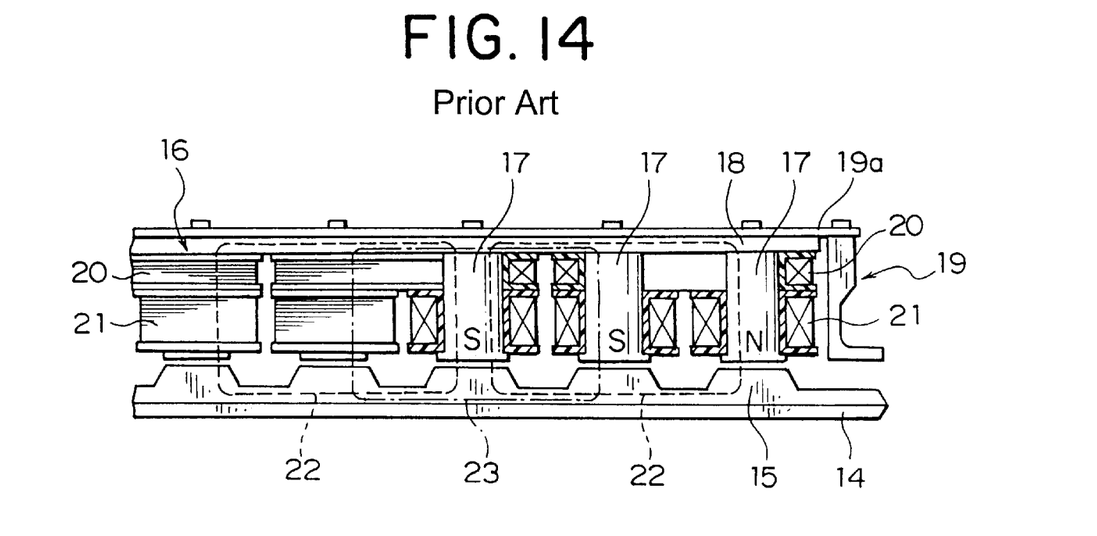
FIG. 14 is a development front view showing an essential section of the conventional inductor generator.

FIG. 13 is a perspective view showing the inductor type generator disclosed in, for example, Japanese Examined Patent Publication No. 2-43029, and FIG. 14 is a development front view showing an essential section of the inductor type generator shown in FIG. 13.

The conventional inductor type generator shown in FIG. 13 and FIG. 14 has many inductor magnetic poles 15 provided at predetermined pitches in a circumferential direction on the outer peripheral surface of a flywheel 14 attached to a crankshaft 13 directly coupled to an engine. The flywheel 14 provided with the inductor magnetic poles 15 constitutes a rotor. The starter 16 is equipped with a plurality of pole cores 17 arranged in the circumferential direction of the flywheel 14. Bottom ends of pole cores 17 face against the inductor magnetic poles 15 with small gaps provided therebetween, while top ends thereof are secured to a cover plate 19a of a case 19 via a stator yoke 18. Each armature coil 20 is wound around two pole cores 17, while each excitation coil 21 is wound around each of the pole cores 17.

In the inductor generator configured as described above, passing Direct currents through the excitation coils 21 causes the excitation coils 21 to be energized. The excitation coils 21 cause the pole cores 17, two each, to be magnetized so that they are magnetized in the opposite directions to each other, and paired pole cores 17 wrapped with the same armature coil 20 are magnetized to have opposite polarities to one another. Accordingly, at a certain moment, a magnetic circuit 22 indicated by a dashed line in FIG. 14 is created, and when the flywheel 14 rotates to cause the inductor magnetic poles 15 to move for an angle corresponding to the pitch of the pole cores 17, a magnetic circuit 23 indicated by a chain line in FIG. 14 is formed. A magnetic flux passing through these magnetic circuits 22 and 23 is interlinked with the armature coils 20, and the direction of the magnetic flux passing through the magnetic circuit 22 is opposite to the direction of the magnetic flux passing through the magnetic circuit 23. Changes in the magnetic fluxes induce electromotive forces in the armature coils 20, causing the motor to act as a generator.

On the other hand, in this conventional inductor generator, the excitation coils 21 are energized by a battery (not shown) to form the magnetic circuits 22 and 23 alternately. At the same time, currents that reverse the directions thereof alternately pass through the armature coils 20 disposed to be interlinked with the magnetic circuits 22 and 23 as the flywheel 14 rotates or the inductor magnetic poles 15 rotate. This causes the armature coils 20 to be subjected to torque in a rotational direction. The armature coils 20 make up a stator, so that it cannot rotate; the inductor magnetic poles 15 are subjected to a reactive force thereof. Thus, the flywheel 14 provided with the inductor poles 15 rotates to provide the motor for starting the engine.

The rotating field pole 4 serving as the rotor of the conventional claw pole synchronous motor is constructed by the first pole cores 7 having many claws 7a, second pole cores 8 having many claws 8a positioned between the claws 7a, and the nonmagnetic ring 9 coupling the two types of pole cores inside the distal ends of the claws 7a and 8a. Hence, the rotor has the complicated structure, presenting a problem in that it exhibits unsatisfactory strength against a centrifugal force during high-speed revolution, leading to a possibility of damage to the rotor during a high-speed operation.

Furthermore, in the conventional inductor generator, each of the armature coils 20 wraps two pole cores 17. This requires a longer coil with consequent higher coil resistance, meaning an increased copper loss when currents pass through the armature coils 20, with resultant deteriorated efficiency.

SUMMARY OF THE INVENTION

The present invention has been made with a view toward solving the problems described above, and it is an object of the present invention to provide a dynamo-electric machine that acts as a motor and a generator, features higher strength against a centrifugal force during high-speed revolution so as to protect a rotor from damage during the high-speed revolution, and also features lower coil resistance of armature coils to suppress deterioration of efficiency caused by copper loss.

In order to achieve the above object, according to one aspect of the present invention, there is provided a dynamo-electric machine including: a stator having an iron core constructed by linking outer peripheral portions of a plurality of teeth arranged at equiangular pitches in a circumferential direction by an annular core back, and a plurality of coils wound around the teeth; and a rotor constructed by a plurality of magnetic poles composed of magnetic members arranged at equiangular pitches in the circumferential direction, the magnetic poles being formed into one piece by a base portion composed of a nonmagnetic member, and the rotor being rotatably disposed around an axis of the stator and adjacently to an inner periphery of the stator, wherein the plurality of coils are composed of a plurality of first coils that are excited by alternating current and a plurality of second coils that are excited by direct current, each of the coils being wound around each of the teeth without involving any other teeth.

DESCRIPTION OF THE PREFERRED EMBODIMENTS

Figure 1:
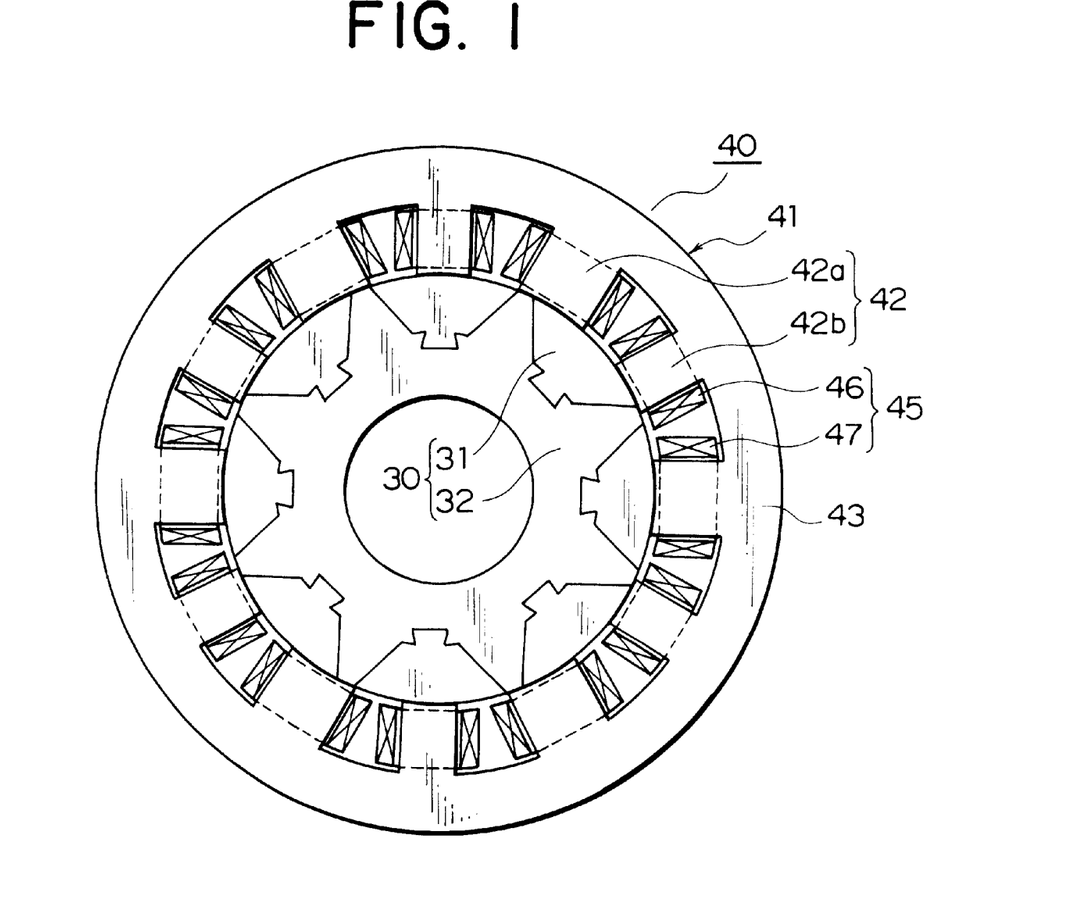
FIG. 1 is a front view showing an essential section of a dynamo-electric machine according to a first embodiment of the present invention.
Figure 2:
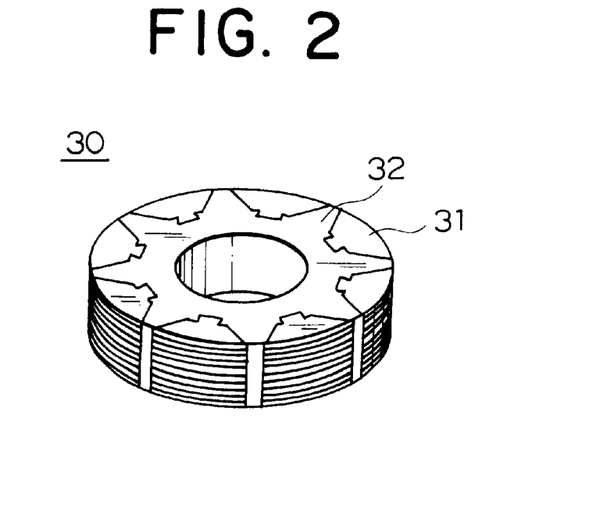
FIG. 2 is a perspective view of a rotor in the dynamo-electric machine according to the first embodiment of the present invention.
Figure 3:
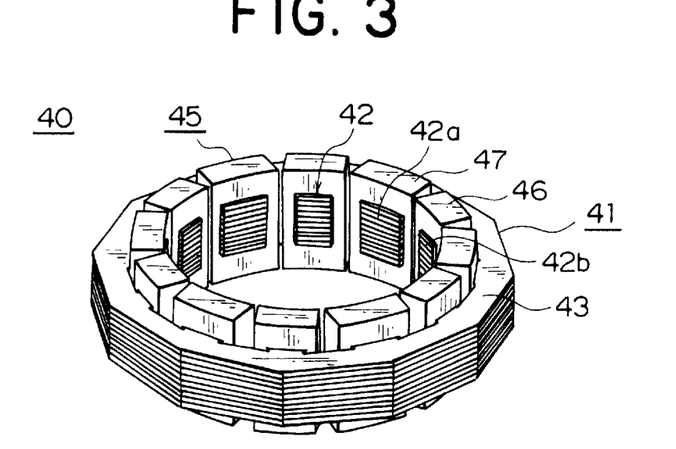
FIG. 3 is a perspective view of a stator in the dynamo-electric machine according to the first embodiment of the present invention.
Figure 4:
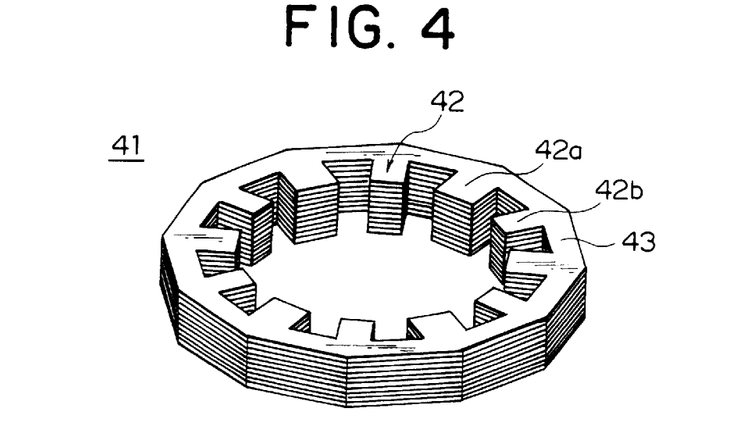
FIG. 4 is a perspective view of an iron core constituting the stator in the dynamo-electric machine according to the first embodiment of the present invention.
Figure 5:
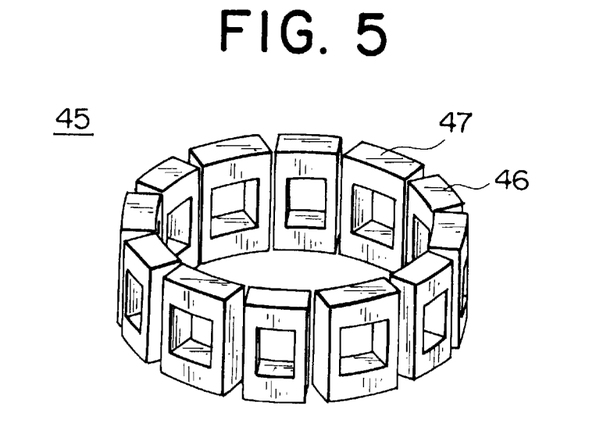
FIG. 5 is a perspective view of a coil constituting the stator in the dynamo-electric machine according to the first embodiment of the present invention.
Figure 6:
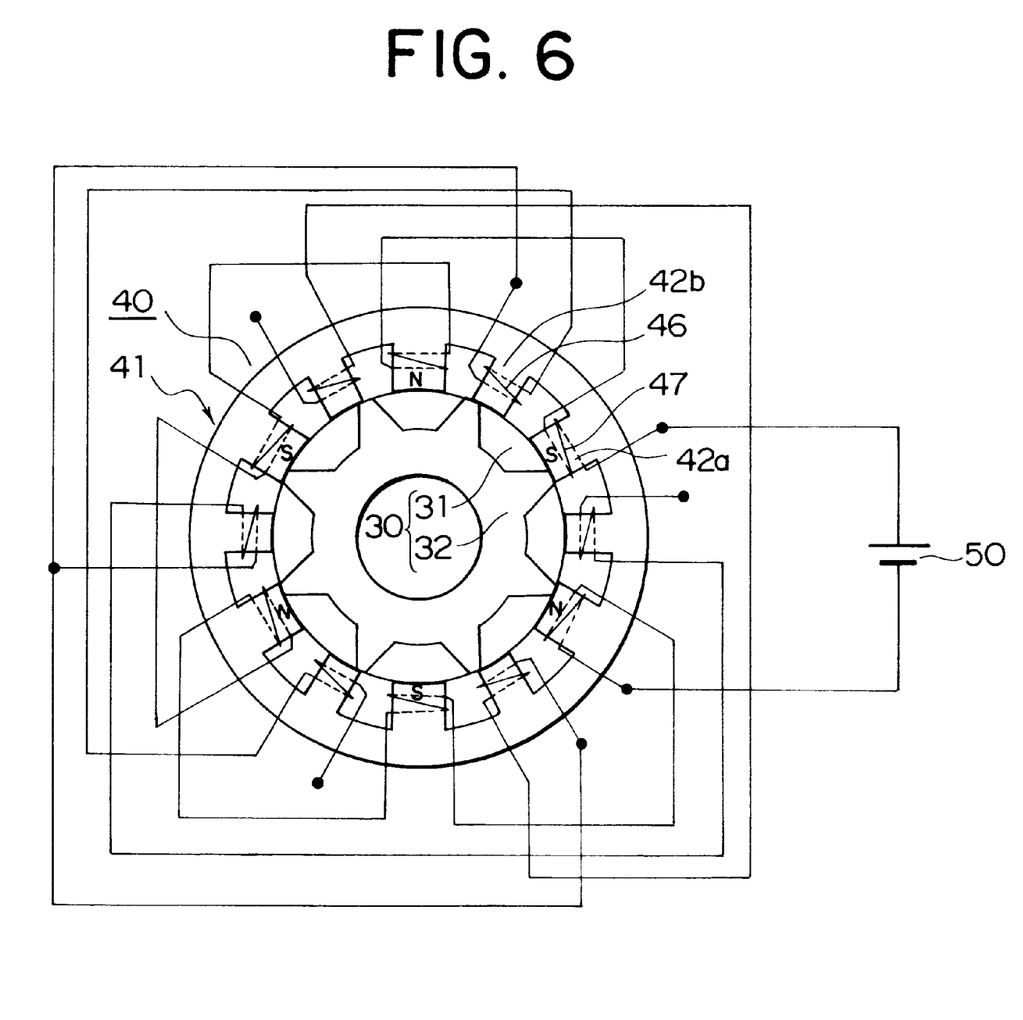
FIG. 6 is an electrical connection diagram of the dynamo-electric machine according to the first embodiment of the present invention.

The following will describe embodiments of the present invention in conjunction with the accompanying drawings.
First Embodiment FIG. 1 is a front view showing an essential section of a dynamo-electric machine according to a first embodiment of the present invention; FIG. 2 is a perspective view of a rotor in the dynamo-electric machine shown in FIG. 1; FIG. 3 is a perspective view showing a stator in the dynamo-electric machine shown in FIG. 1; FIG. 4 is a perspective view of an iron core constituting the stator shown in FIG. 3; FIG. 5 is a perspective view of a coil constituting the stator shown in FIG. 3; and FIG. 6 is an electrical connection diagram of the dynamo-electric machine according to the first embodiment of the present invention.

Referring to FIG. 1 through FIG. 5, a rotor 30 includes eight magnetic poles 31 that are composed of approximately trapezoidal magnetic members arranged in a circumferential direction, and supported and secured by a base portion 32 composed of nonmagnetic member. The rotor 30 of this embodiment is fabricated by placing the eight magnetic poles 31, which have been integrally formed by stacking thin magnetic steel plates, in a casting mold at equiangular pitches in a circumferential direction, and pouring melted aluminum into the casting mold. The rotor 30 thus fabricated has the magnetic poles 31 and the base portion 32 formed into one piece, has a disc-like shape as a whole, and is configured so that outer peripheral surfaces of the magnetic poles 31 are exposed at equiangular pitches in the circumferential direction.

A stator 40 is equipped with a cylindrical iron core 41 formed by stacking thin magnetic steel plates into one piece, and coils 45 wound around the iron core 41. The iron core 41 is formed by twelve teeth 42 and an annular core back 43 that links outer peripheral portions of the teeth 42. The teeth 42 are arranged at equiangular pitches in the circumferential direction, and constructed by wide teeth 42a and narrow teeth 42b that are alternately disposed in the circumferential direction. Each of the coils 45 includes a first coil 46 that is excited by alternating current and a second coil 47 that is excited by direct current, these coils being formed by winding conductors a predetermined number of turns into annular shapes. Each of the first coils 46 is wound around each of the teeth 42b without involving any other teeth, while each of the second coils 47 is wound around each of the teeth 42a without involving any other teeth.

The rotor 30 is rotatably disposed around an axis of the stator 40 so that it is adjacent to an inner periphery of the stator 40 and a small gap is provided between the outer peripheral surfaces of the magnetic poles 31 and distal end surfaces of the teeth 42.

The second coils 47 respectively wound around the six teeth 42a are connected in series and further connected to a DC power source 50. The six second coils 47 are connected such that the north and south polarities appear alternately at the teeth 42a with respect to the circumferential direction when the DC power source 50 is connected.

Each of the first coils 46 wound around each of the six teeth 42b is connected in series to the first coil 46 wound around the seventh tooth 42b counted from the tooth 42b around which itself is wound, including the tooth 42a around which itself is wound. Two first coils 46 are wound so that the polarities of magnetic poles produced at the distal ends of the first and seventh teeth 42b are opposite when currents are passed through the two first coils 46 connected in series. This arrangement forms three sets of ac-excited windings that have phase differences of a 120-degree electrical angle from one another. In other words, the three sets of windings, each being formed by the two first coils 46 connected in series, are in three-phase, Y-connection.

An operation of the dynamo-electric machine with the above configuration when it acts as a generator will be described.

First, when the DC power source 50 is connected to a group of the second coils 47 connected in series, the six teeth 42a are magnetized such that the north and south polarities alternately appear with respect to the circumferential direction. Then, when the rotor 30 rotates and reaches a position where the magnetic pole 31 extends over the tooth 42a magnetized to the north polarity and the tooth 42b adjacent thereto, the adjacent tooth 42b is magnetized to the north polarity. As the rotor 30 further rotates until it reaches a position where the magnetic pole 31 extends over the tooth 42b magnetized to the north polarity and the tooth 42a magnetized to the south polarity, the tooth 42b which has been magnetized to the north polarity is now magnetized to the south polarity. Thus, the teeth 42b are alternately magnetized to the north polarity and the south polarity as the rotor 30 rotates; therefore, the magnetic fluxes passing through the teeth 42b reverse. This induces electromotive forces in the first coils 46 wound around the teeth 42b, generating power.

Descriptions will now be given of an operation of the dynamo-electric machine when it acts as a motor.

In this case also, a DC power source 50 is connected to a group of the second coils 47 connected in series, and the six teeth 42a are magnetized such that the north polarity and the south polarity alternately appear in the circumferential direction.

If current is passed through the first coil 46 when the circumferential center of the magnetic pole 31 substantially coincides with the center of the first coil 46, then the magnetic pole 31 or the rotor 30 attempts to move to extend over the first coil 46 and the second coil 47 that produces a magnetic pole opposite to that produced by the first coil 46. In other words, if the tooth 42a positioned, in the rotational direction, before the tooth 42b that agrees with the magnetic pole 31 in the circumferential center has been magnetized to the south polarity, then the magnetic pole 31 attempts to move toward the tooth 42a that is positioned ahead in the rotational direction and has been magnetized to the south polarity when current is supplied to the first coil 46 wound around the tooth 42b so as to magnetize the tooth 42b to the north polarity. Thus, torque in the rotational direction can be obtained.

Then, when a midpoint between the magnetic pole 31 that has moved ahead in the rotational direction and the magnetic pole 31 positioned behind in the rotational direction coincides with the circumferential center of the tooth 42b magnetized to the north polarity, reverse current is passed through the first coil 46 to switch the polarity of the tooth 42b from the north polarity to the south polarity. This causes the magnetic pole 31 positioned behind the preceding magnetic pole 31 in the rotational direction to attempt to move so as to extend over the tooth 42b magnetized to the south polarity and the tooth 42a positioned behind, in the rotational direction, the tooth 42b magnetized to the south polarity. Thus, torque in the rotational direction can be obtained.

The group of the first coils 46 is formed of three sets of ac-excited windings having phase differences of a 120-degree electrical angle. Hence, supplying a three-phase alternating current to the group of the first coils 46 makes it possible to continuously generate rotational torque.

Accordingly, a dynamo-electric machine operating as a motor and a generator can be achieved by installing the rotor 30 configured as described above to the crankshaft 2 or 13 in place of the rotor shown in FIG. 12 or FIG. 13 and by installing the stator 40 in a case such that it covers an outer periphery of the rotor 30.

According to the first embodiment, the first coils 46, which are the coils excited by alternating current, and the second coils 47, which are the coils excited by direct current, are wound to the stator, thus obviating the need for a mechanism for supplying currents to rotating components or for taking out currents from the rotating components. This arrangement makes it possible to implement a brushless dynamo-electric machine with a simpler structure and higher reliability.

Moreover, the rotor 30 is constructed by the magnetic poles 31 that are arranged in the circumferential direction and integrally supported by the base portion 32 composed of a nonmagnetic member, thus enabling the rotor 30 to have a simpler structure than that of a claw pole rotor, and an enhanced strength against revolution so as to restrain damage to the rotor during high-seed revolution.

Furthermore, since each of the first coils 46 and the second coils 47 is wound around each of the teeth 42a and 42b without involving any other teeth, the coil length can be reduced, permitting less coil resistance. This leads to a smaller copper loss with resultant higher efficiency when current is passed through the coils.

The first and second coils 46 and 47 are alternately disposed in the circumferential direction, so that the first and second coils 46 and 47 are arranged in a single line in the circumferential direction. With this arrangement, the axial dimension can be decreased, permitting a reduced size to be achieved.

In addition, the twelve teeth 42a and 42b are arranged at the equiangular pitches in the circumferential direction, and the eight magnetic poles 31 are also arranged at the equiangular pitches in the circumferential direction, allowing first coils 46 wound around the teeth 42b to construct the three-phase AC windings. This arrangement enables a conventional three-phase inverter to be used, and lower cost to be achieved. Similarly, the first coils 46 are in the three-phase, Y-connection, so that the conventional three-phase inverter can be used, and lower cost can be achieved.

The second coils 47, which are the coils excited by direct current, are wound around every other teeth 42a such that the north polarity and the south polarity appear alternately in the circumferential direction; hence, the magnetic fluxes interlinked with the first coils 46 reverse. With this arrangement, a reduced size can be achieved because an area of the iron core 41, which provides a magnetic path, can be reduced as compared with a case where a magnetic flux has a half amplitude, meaning a change in only one direction from zero.

Furthermore, since the magnetic poles 31 through which AC magnetic fields pass are formed of stacked thin magnetic steel plates, occurrence of eddy currents can be reduced, permitting improved efficiency.

The base portion 32 is formed by aluminum die casting; therefore, the rotor 30 can be fabricated by placing the magnetic poles 31 in a casting mold and pouring melted aluminum into the casting mold (die casting), permitting easier fabrication.

The magnetic poles 31 are formed to have approximately trapezoidal shapes, so that the circumferential gaps between adjoining magnetic poles 31 gradually expand inward in the radial direction, leading to decreased leakage fluxes. This obviates the need for a magnetic path for passing excess leakage fluxes, thus permitting a reduced size.

The magnetic flux passing through the teeth 42a, around which the second coils 47 excited by direct current are wound, is larger than the magnetic flux passing though the teeth 42b, around which the first coils 46 excited by alternating current are wound. Hence, the sectional areas of the teeth 42a must be increased to prevent magnetic saturation. Decreasing the sectional areas of the teeth 42b, while increasing the sectional areas of the teeth 42a accordingly permits a reduced size of the stator. The sectional areas of the teeth can be adjusted by adjusting the circumferential widths and the axial lengths thereof.

In the first embodiment, the widths of the teeth 42a, around which the second coils 47 excited by direct current are wound, are larger than the widths of the teeth 42b, around which the first coils 46 excited by alternating current are wound. This arrangement allows the sectional areas of the teeth to be adjusted by the circumferential widths thereof, making it possible to achieve a reduced thickness without increasing the axial dimensions.

Preferably, the sectional areas of the teeth 42a are set to be substantially 1.4 times the sectional areas of the teeth 42b. This will make the magnetic flux densities of both teeth 42a and 42b equal.

Second Embodiment

Figure 7:
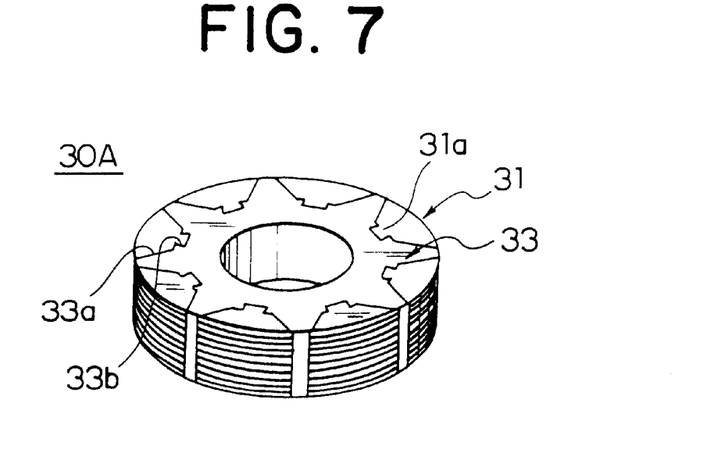
FIG. 7 is a perspective view of a rotor in a dynamo-electric machine according to a second embodiment of the present invention.

In a second embodiment, magnetic poles 31 are integrally retained by a base portion 33 composed of stainless steel to constitute a rotor 30A as shown in FIG. 7. In this embodiment, the base portion 33 has recessed sections 33a for accommodating the magnetic poles 31, and bottom portions of the recessed sections 33a have wedge-shaped recessed sections 33b. Wedge-shaped protuberances 31a are formed on the bottom portions of the magnetic poles 31. The magnetic poles 31 are fitted into the recessed sections 33a from the axial direction so that the protuberances 31a are fitted into the recessed sections 33b. Thereafter, the magnetic poles 31 are coupled integrally to the base portion 33 by caulking or welding so as to provide the rotor 30A. The rest of the construction of this embodiment is the same as the construction of the first embodiment described above.

According to the second embodiment, since the base portion 33 is composed of stainless steel, the strength of the rotor is enhanced as compared with the base portion 32 formed by aluminum die casting, making it possible to securely prevent damage to the rotor during high-speed revolution.

Third Embodiment

Figure 8:
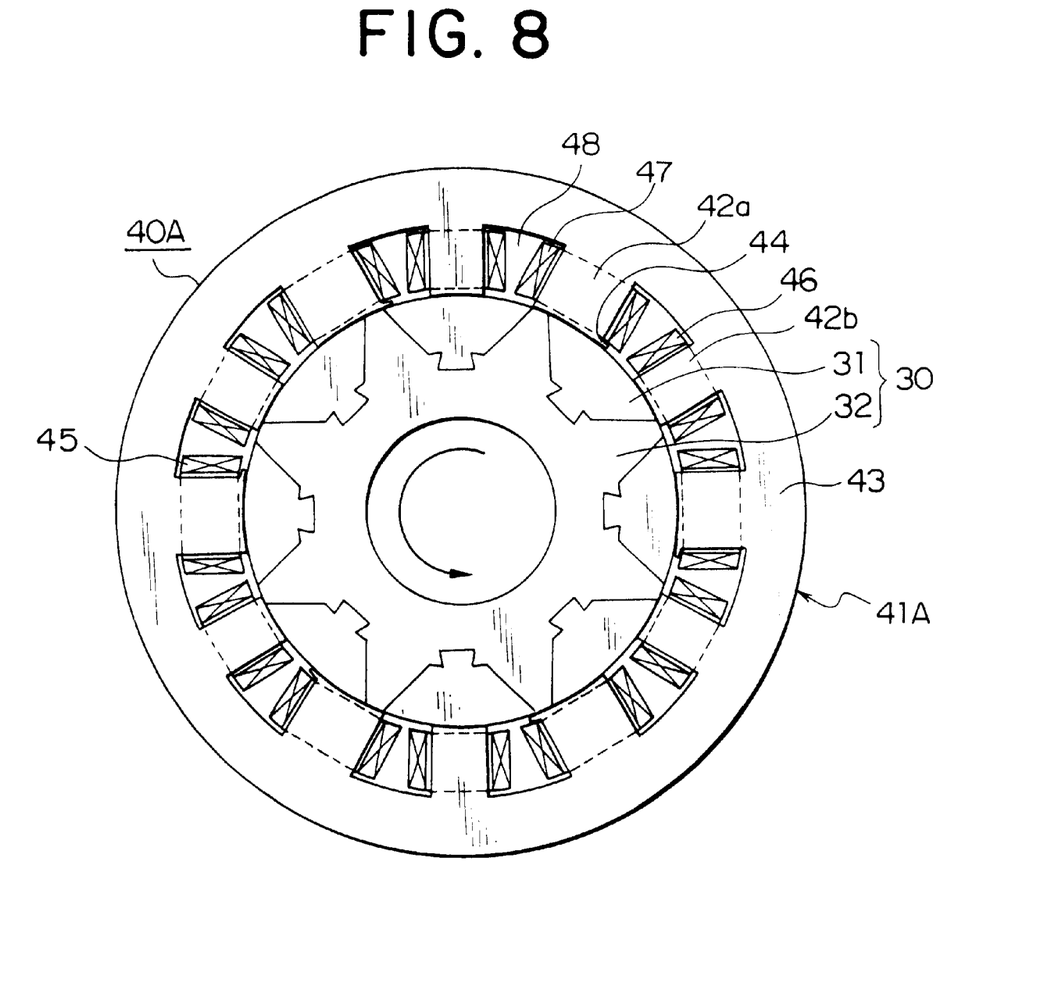
FIG. 8 is a front view showing an essential section of a dynamo-electric machine according to a third embodiment of the present invention.
Figure 9:
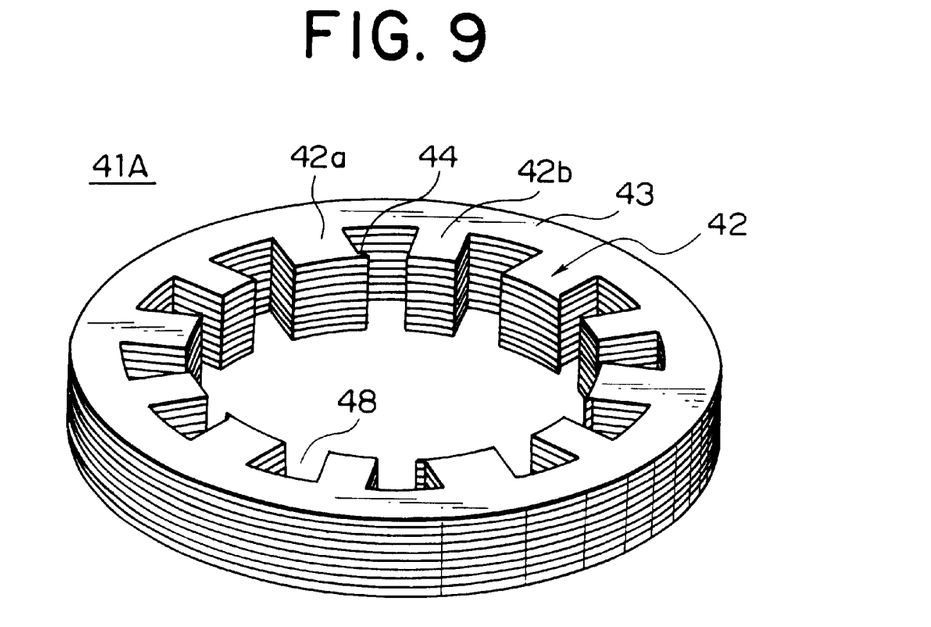
FIG. 9 is a perspective view showing a stator iron core applied to the dynamo-electric machine according to the third embodiment of the present invention.

FIG. 8 is a front view showing an essential section of a dynamo-electric machine according to a third embodiment of the present invention; FIG. 9 is a perspective view showing a stator iron core applied to the dynamo-electric machine shown in FIG. 8; and FIG. 10 is a perspective view showing a stator applied to the dynamo-electric machine shown in FIG. 8.

Figure 10:
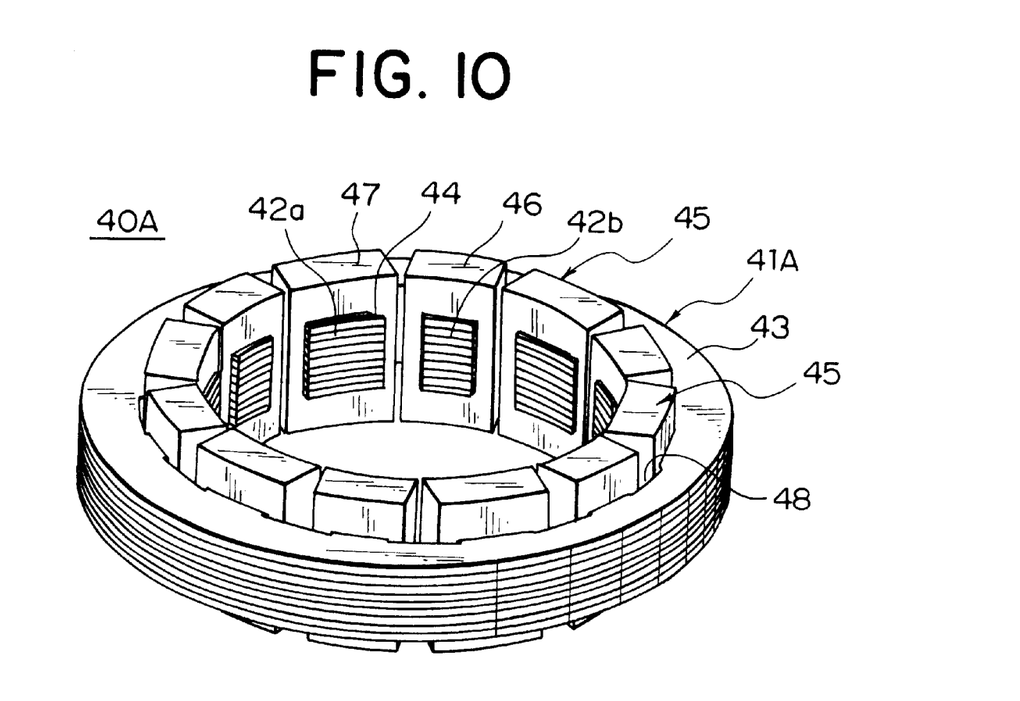
FIG. 10 is a perspective view showing a stator in the dynamo-electric machine according to the third embodiment of the present invention.

Referring to FIG. 8 through FIG. 10, an iron core 41A constituting a stator 40A is formed of thin magnetic steel plates stacked into one piece, and is constructed by twelve teeth 42 and an annular core back 43 connecting outer peripheral portions of the teeth 42. The teeth 42 are arranged at equiangular pitches in the circumferential direction, and constructed by wide teeth 42a and narrow teeth 42b that are alternately disposed in the circumferential direction. Furthermore, jaws 44 are provided in the circumferential direction such that they extend backward relative to a rotational direction from the distal ends of the respective teeth 42a. The rest of the construction of this embodiment is the same as the construction of the first embodiment described above.

In the first embodiment, the magnetic flux interlinked with the first coils 46 wound around the teeth 42b becomes zero when the circumferential centers of the magnetic poles 31 coincide with the circumferential centers of the teeth 42b and when the midpoint between adjoining magnetic poles 31 coincides with the circumferential center of the tooth 42b. On the other hand, the magnetic flux interlinked with the first coils 46 wound around the teeth 42b reaches its maximum level when the circumferential center of the magnetic pole 31 coincides with the circumferential center of an opening of a slot 48 formed between adjoining teeth 42a and 42b. The position of the rotors 30 where the magnetic flux interlinked with the first coils 46 reaches its maximum level is not a midpoint between two positions of the rotor 30 where the magnetic flux interlinked with the first coils 46 becomes zero; the position is shifted backward relative to the rotational direction, or the position is shifted toward the circumferential center of the tooth 42b. Hence, the magnetic flux interlinked with the first coil 46 is shifted from a sinusoidal wave, resulting in torque fluctuation.

In the third embodiment, the jaws 44 are provided in the circumferential direction such that they extend from the distal ends of the teeth 42a backward relative to the rotational direction; hence, the circumferential centers of the openings of the slots 48 are shifted backward relative to the rotational direction. With this arrangement, the position of the rotor 30 where the magnetic flux interlinked with the first coils 46 reaches its maximum level is brought closer to the midpoint between two positions of the rotor 30 where the magnetic flux interlinked with the first coils 46 becomes zero. As a result, the magnetic flux interlinked with the first coils 46 is approximated to a sinusoidal wave, thus permitting torque fluctuation to be restrained.

Furthermore, since the jaws 44 are provided on one side of the teeth 42a in the circumferential direction, the symmetry of magnetic flux is improved, contributing to further restraint of torque fluctuation.

In the third embodiment described above, the jaws 44 are provided on one side of the teeth 42a in the circumferential direction. Alternatively, however, the jaws 44 may be provided on both sides of the teeth 42a in the circumferential direction so that the circumferential centers of the openings of the slots 48 are shifted backward relative to the rotational direction. In this case, the areas of air gaps between the teeth 42a and the magnetic poles 31 are increased, providing an additional advantage of increased torque.

Fourth Embodiment

Figure 11:
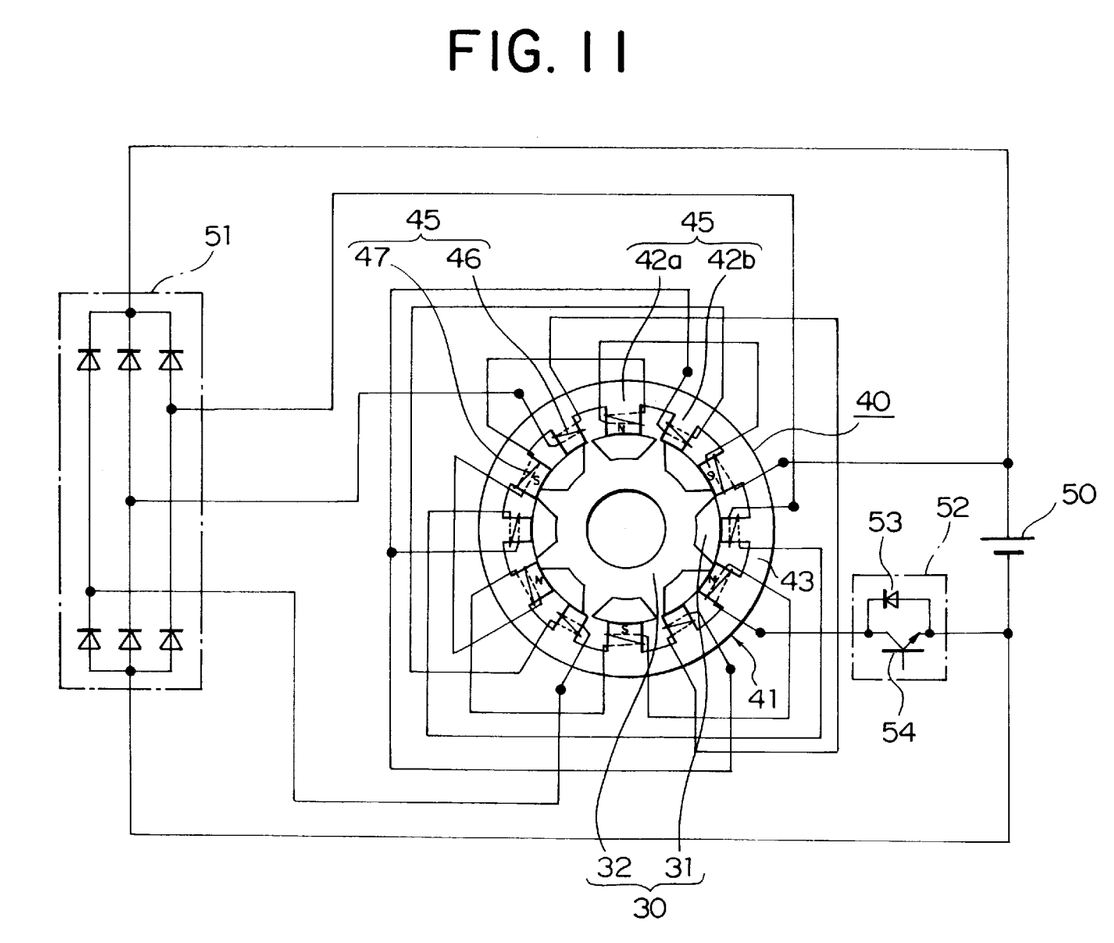
FIG. 11 is an electrical connection diagram of a dynamo-electric machine according to a fourth embodiment of the present invention.

In a fourth embodiment shown in FIG. 11, a three-phase diode bridge 51 is connected to output terminals of a three-phase AC winding composed of first coils 46 wound around teeth 42b, and a current control circuit 52 formed of a diode 53 and a transistor 54 is connected between a second coil 47 and a DC power source 50 connected in series. The rest of the configuration of this embodiment is the same as the configuration of the first embodiment described above.

The fourth embodiment operates as a brushless DC generator because an electromotive force induced at the first coil 46 is converted into direct current by the three-phase diode bridge 51. Moreover, power can be generated without an inverter, permitting a reduction in cost.

The current control circuit 52 carries out control so as to decrease DC excitation current supplied to the second coil 47 during high-speed revolution and to increase the DC excitation current supplied to the second coil 47 during low-speed revolution. Hence, magnetic flux interlinked with the first coil 46 is decreased with a consequent smaller electromotive force induced in the first coil 46, allowing an operation of high-speed revolution to be performed. On the other hand, for the low-speed revolution, the magnetic flux interlinked with the first coil 46 increases with a consequent larger electromotive force induced in the first coil 46, allowing high torque to be obtained. This will expand an operable revolution range.

When operating the dynamo-electric machine as a generator, an amount of power to be generated is controlled by controlling DC excitation current by the current control circuit 52, thus permitting easier control of the amount of power generated and also a reduction in cost.

In the embodiments described above, the first coils 46 excited by alternating current constitute the three-phase AC winding. The present invention, however, is not limited to the three-phase; it is obvious that the invention can be applied also to, for example, a single-phase, a fourth-phase, and a five-phase.

In the above embodiments, the twelve teeth 42 are arranged at equiangular pitches in the circumferential direction, and the eight magnetic poles are also arranged at equiangular pitches in the circumferential direction. However, when the three-phase AC winding is constructed by the first coils 46 excited by alternating current, any numbers of the teeth and the magnetic poles may be used as long as the ratio of the number of the teeth 42 and the number of the magnetic poles 31 remains to be 12n:8n ("n" is an integer).

Furthermore, in the embodiments described above, the first coils 46 are in the three-phase Y connection; however, the same advantage can be obtained when the first coils 46 are in a three-phase delta connection.

The present invention configured as described above provides the following advantages:

The dynamo-electric machine according to the present invention includes: a stator having an iron core constructed by linking outer peripheral portions of a plurality of teeth arranged at equiangular pitches in a circumferential direction by an annular core back, and a plurality of coils wound around the teeth; and a rotor constructed by a plurality of magnetic poles composed of magnetic members arranged at equiangular pitches in the circumferential direction, the magnetic poles being formed into one piece by a base portion composed of a nonmagnetic member, and the rotor being rotatably disposed around an axis of the stator and adjacently to an inner periphery of the stator, wherein the plurality of coils are composed of a plurality of first coils that are excited by alternating current and a plurality of second coils that are excited by direct current, each of the coils being wound around each of the teeth without involving any other teeth. This arrangement makes it possible to implement a brushless dynamo-electric machine operating as a motor and a generator which exhibits enhanced strength against a centrifugal force during high-speed revolution so as to be able to protect a rotor from damage during the high-speed revolution, and also exhibits less coil resistance of the second coils excited by direct current so as to be able to restrain a drop in efficiency caused by copper loss.

The first coils and the second coils are alternately disposed in the circumferential direction, so that the axial dimension can be reduced, permitting a reduced size to be achieved.

The ratio of the number of the teeth and the number of the magnetic poles is set to 12n:8n ("n" is an integer), allowing a three-phase winding excited by alternating current to be constructed easily. A conventional three-phase inverter can be used, permitting lower cost to be attained.

The second coils are wound around the teeth such that they are magnetized to opposite polarities alternately with respect to the circumferential direction when they are excited by direct current. With this arrangement, the area of the iron core providing the magnetic path can be decreased, permitting a reduced size to be attained.

The plural first coils are in the three-phase Y connection or the three-phase delta connection, so that a conventional three-phase inverter can be used, thus saving cost.

The sectional areas of the teeth around which the second coils are wound are larger than the sectional areas of the teeth around which the first coils are wound, so that the whole stator can be made smaller.

The widths of the teeth around which the second coils are wound are larger than the widths of the teeth around which the first coils are wound. This arrangement allows the sectional areas of the teeth to be adjusted by the widths of the teeth, making it possible to achieve a reduced thickness without increasing the axial dimension.

The circumferential centers of the openings of the slots formed by the teeth around which the first coils are wound and the teeth around which the second coils are wound are shifted toward the circumferential centers of the teeth around which the first coils are wound. With this arrangement, the magnetic flux interlinked with the first coils is approximated to a sinusoidal wave, allowing torque fluctuation to be restrained.

The distal ends of the teeth wrapped with the second coils are provided with jaws extending in the circumferential direction. Hence, the areas of the air gaps between the teeth wrapped with the second coils and the magnetic poles are increase, enabling larger torque to be obtained.

The jaws are provided on the distal ends of the teeth wrapped with the second coils such that the jaws extend backward relative to the rotational direction of the rotor. This will improve the symmetry of magnetic flux, contributing to less torque fluctuation.

The magnetic poles are formed of stacked thin magnetic steel plates, so that occurrence of eddy currents caused by AC magnetic fields passing through the magnetic poles can be reduced, permitting improved efficiency.

The base portion is formed by aluminum die casting, so that easier fabrication of the rotor can be accomplished.

The base portion is composed of stainless steel, so that the strength against the centrifugal forces produced at high-speed revolution is further enhanced, making it possible to securely prevent damage to the rotor during the high-speed revolution.

The magnetic poles are formed so that the circumferential gaps between adjoining magnetic poles gradually expand inward in the radial direction. This arrangement leads to decreased leakage fluxes and obviates the need for a magnetic path for passing excess leakage fluxes, thus permitting a reduced size.

A current control circuit is provided to control DC excitation current to be supplied to the second coils. The operable revolution range can be expanded by decreasing the DC excitation current during high-speed revolution while increasing the DC excitation current during low-speed revolution by the current control circuit. Furthermore, the amount of power to be generated can be controlled by controlling the DC excitation current by the current control circuit, permitting easier control of the amount of power to be generated and lower cost to be attained.

The three-phase diode bridge is connected to the plural first coils, so that the dynamo-electric machine can be used as a DC generator. This allows power to be generated without an inverter, contributing to lower cost.

What is claimed is:

1. A dynamo-electric machine comprising:
    a stator constructed by linking outer peripheral portions of a plurality of teeth arranged at equiangular pitches in a circumferential direction by an annular core back, and a plurality of coils wound around the teeth; and
    a rotor constructed by a plurality of magnetic poles composed of magnetic members arranged at equiangular pitches in the circumferential direction, the magnetic poles being formed into one piece by a base portion composed of a nonmagnetic member, and the rotor being rotatably disposed around an axis of the stator and adjacently to an inner periphery of the stator,
    wherein the plurality of coils are composed of a plurality of first coils that are excited by alternating current and a plurality of second coils that are excited by direct current, with one coil being wound around each tooth without involving any other teeth, and
    wherein the first coils and the second coils are alternately disposed in a circumferential direction.

2. A dynamo-electric machine according to claim 1, wherein a ratio of a number of the teeth and a number of the magnetic poles is 12n:8n ("n" is an integer).

3. A dynamo-electric machine according to claim 2, wherein the second coils are wound around the teeth such that they are magnetized to have opposite polarities alternately relative to the circumferential direction when they are excited by direct current.

4. A dynamo-electric machine according to claim 2, wherein the second coils are wound around the teeth such that they are magnetized to have opposite polarities alternately relative to the circumferential direction when they are excited by direct current.

5. A dynamo-electric machine according to claim 1, wherein sectional areas of the teeth around which the second coils are wound are larger than sectional areas of the teeth around which the first coils are wound.

6. A dynamo-electric machine according to claim 5, wherein widths of the teeth around which the second coils are wound are larger than widths of the teeth around which the first coils are wound.

7. A dynamo-electric machine according to claim 1, wherein circumferential centers of openings of slots formed by the teeth around which the first coils are wound and the teeth around which the second coils are wound are shifted toward circumferential centers of the teeth around which the first coils are wound.

8. A dynamo-electric machine according to claim 1, wherein the distal ends of only the teeth wrapped with the second coils are provided with jaws extending in the circumferential direction.

9. A dynamo-electric machine according to claim 8, wherein the jaws are provided on the distal ends of the teeth, around which the second coils are wound, such that the jaws extend backward relative to a rotational direction of the rotor.

10. A dynamo-electric machine according to claim 1, wherein the magnetic poles are formed so that circumferential gaps between adjoining ones of the magnetic poles gradually expand inward in a radial direction.

* * * * *